US 012443798B2

(12) United States Patent
Severtson

(10) Patent No.: US 12,443,798 B2
(45) Date of Patent: Oct. 14, 2025

(54) METHODS AND SYSTEMS FOR PREPARING UNSTRUCTURED DATA FOR STATISTICAL ANALYSIS USING ELECTRONIC CHARACTERS

(71) Applicant: STATE FARM MUTUAL AUTOMOBILE INSURANCE COMPANY, Bloomington, IL (US)

(72) Inventor: Forrestt Severtson, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 500 days.

(21) Appl. No.: 17/845,689

(22) Filed: Jun. 21, 2022

(65) Prior Publication Data

US 2023/0023636 A1    Jan. 26, 2023

Related U.S. Application Data

(60) Provisional application No. 63/214,097, filed on Jun. 23, 2021.

(51) Int. Cl.
*G06F 40/295* (2020.01)
*G06N 5/022* (2023.01)

(52) U.S. Cl.
CPC ........... *G06F 40/295* (2020.01); *G06N 5/022* (2013.01)

(58) Field of Classification Search
CPC ....... G06F 40/295; G06F 40/30; G06N 5/022; G06N 20/00
See application file for complete search history.

(56) References Cited

U.S. PATENT DOCUMENTS

| | | | |
|---|---|---|---|
| 2017/0185581 A1* | 6/2017 | Bojja | G06V 30/19173 |
| 2019/0073411 A1* | 3/2019 | Booker | G06F 16/955 |
| 2019/0122403 A1* | 4/2019 | Woo | G06V 10/44 |
| 2019/0347668 A1* | 11/2019 | Williams | G06N 5/046 |
| 2019/0377818 A1 | 12/2019 | Andritsos | |

(Continued)

OTHER PUBLICATIONS

Okuda et al, A method for the Correction of Garbled Words Based on the Levenshtein Metric, IEEE Transaction on Computers, pp. 172-178, Feb. 1976 (Year: 1976).*

(Continued)

*Primary Examiner* — Michael N Opsasnick
(74) *Attorney, Agent, or Firm* — MARSHALL, GERSTEIN & BORUN LLP

(57) ABSTRACT

Systems and methods are described for preparing unstructured data for machine learning analysis. An example method may include: receiving data representing a plurality of processes; analyzing the data to identify, for each process of the plurality of processes, a time-ordered sequence of events that occurred during the process; generating a plurality of emoji sequences by, for each process of the plurality of processes, generating an emoji sequence, each emoji in the emoji sequence representing an event of the events that occurred during the process, and the emoji sequence ordered in accordance with the time-ordered sequence; generating a plurality of feature vectors corresponding to the respective plurality of emoji sequences; and applying a machine learning technique to the plurality of feature vectors.

20 Claims, 9 Drawing Sheets

(56) References Cited

U.S. PATENT DOCUMENTS

| | | | | |
|---|---|---|---|---|
| 2020/0073485 | A1* | 3/2020 | Al-Halah | G06F 16/5846 |
| 2020/0090009 | A1* | 3/2020 | Arora | G06F 18/23 |
| 2020/0219295 | A1* | 7/2020 | el Kaliouby | G06T 11/00 |
| 2021/0097468 | A1* | 4/2021 | Socolof | G06Q 10/06393 |
| 2021/0152501 | A1* | 5/2021 | Rai | H04L 51/046 |
| 2022/0092028 | A1* | 3/2022 | Layton | G06F 16/284 |

OTHER PUBLICATIONS

GitHub, Inc., BPMN support for PM4Py, downloaded from the Internet at: <https://github.com/pm4py/pm4py-bpmn> (Jun. 2019).
International Conference on Process Mining (ICPM), Process Mining Conference Series, https://icpmconference.org/ (2019, 2020).
Process Mining Group, Math&CS department, Eindhoven University of Technology, http://www.processmining.org/ (2016).
Process Mining Manifesto, IEEE CIS Task Force on Process Mining, 15 pages (2012).
Process Mining: Data Science in Action, downloaded from the Internet at: <https://www.coursera.org/learn/process-mining> (Jul. 2017).
Website for bupaR, Janssenswillen, G., Depaire, B., Swennen, M., Jans, M., & Vanhoof, K. (2019). bupaR: Enabling reproducible business process analysis. Knowledge-Based Systems, 163, 927-930.
Website for Celonis, downloaded from the Internet at: <https://www.celonis.com/> (Jul. 2016).
U.S. Appl. No. 16/688,106, filed Nov. 19, 2019.

\* cited by examiner

FIG. 3

METHODS AND SYSTEMS FOR PREPARING UNSTRUCTURED DATA FOR STATISTICAL ANALYSIS USING ELECTRONIC CHARACTERS

CROSS-REFERENCE TO RELATED APPLICATION

This application claims priority to and the benefit of the filing date of provisional U.S. Patent Application No. 63/214,097 entitled "COMPUTERIZED METHOD FOR VISUALIZING CATEGORIAL VALUES," filed on Jun. 23, 2021. The entire contents of the provisional application are hereby expressly incorporated herein by reference.

FIELD OF THE DISCLOSURE

Systems and methods are disclosed for preparing unstructured data for statistical analysis and/or machine learning using electronic characters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Process mining is a new discipline in the fields of data science and big data. A goal of process mining is to understand complex sequences of events in order to optimize processes. For example, a hospital may seek to analyze events related to patient care to quantify patient treatment and to improve patient outcomes. As another example, an insurer may seek to analyze claims data to gain insights regarding events that occur during claims processing. Traditionally, process mining includes capturing event content in a storage medium, and analyzing the event content to draw conclusions regarding processes, such as by identifying bottlenecks or inefficient portions of a process. The event content may correspond to events which occur in an organization (e.g., a patient was moved from an intensive care unit to another unit, or an interaction occurred between a claimant and an insurer). Event content is conventionally stored in textual form (e.g., a patient chart, an electronic health care record, a digital file, etc.).

Problematically, event content is often stored as unstructured data, which may not have a pre-defined data model, or be organized in a pre-defined manner. As a result, analytical methods requiring a specific input format cannot easily be applied to unstructured data. Accordingly, a challenge exists in preparing unstructured data such that the unstructured data can be analyzed using statistical and/or machine learning techniques, while minimizing loss of information included in the unstructured data.

SUMMARY

An example embodiment of the techniques of this disclosure is a method for preparing unstructured data for machine learning analysis. The method can be performed by one or more processors, and may include: receiving data representing a plurality of processes; analyzing the data to identify, for each process of the plurality of processes, a time-ordered sequence of events that occurred during the process; generating a plurality of emoji sequences by, for each process of the plurality of processes, generating an emoji sequence, each emoji in the emoji sequence representing an event of the events that occurred during the process, and the emoji sequence ordered in accordance with the time-ordered sequence; generating a plurality of feature vectors corresponding to the respective plurality of emoji sequences; and applying, by the one or more processors, a machine learning technique to the plurality of feature vectors.

Another example embodiment of these techniques is a computing system for preparing unstructured data for machine learning analysis. The computing system may include one or more processors and a memory including executable instructions, that when executed by the one or more processors, cause the computing system to: receive data representing a plurality of processes; analyze the data to identify, for each process of the plurality of processes, a time-ordered sequence of events that occurred during the process; generate a plurality of emoji sequences by, for each process of the plurality of processes, generating an emoji sequence, each emoji in the emoji sequence representing an event of the events that occurred during the process, and the emoji sequence ordered in accordance with the time-ordered sequence; generate a plurality of feature vectors corresponding to the respective plurality of emoji sequences; and apply a machine learning technique to the plurality of feature vectors.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

FIG. 3 illustrates example clusters of processes, each sequence of events corresponding to a process represented as an emoji sequence;

Figure 1:
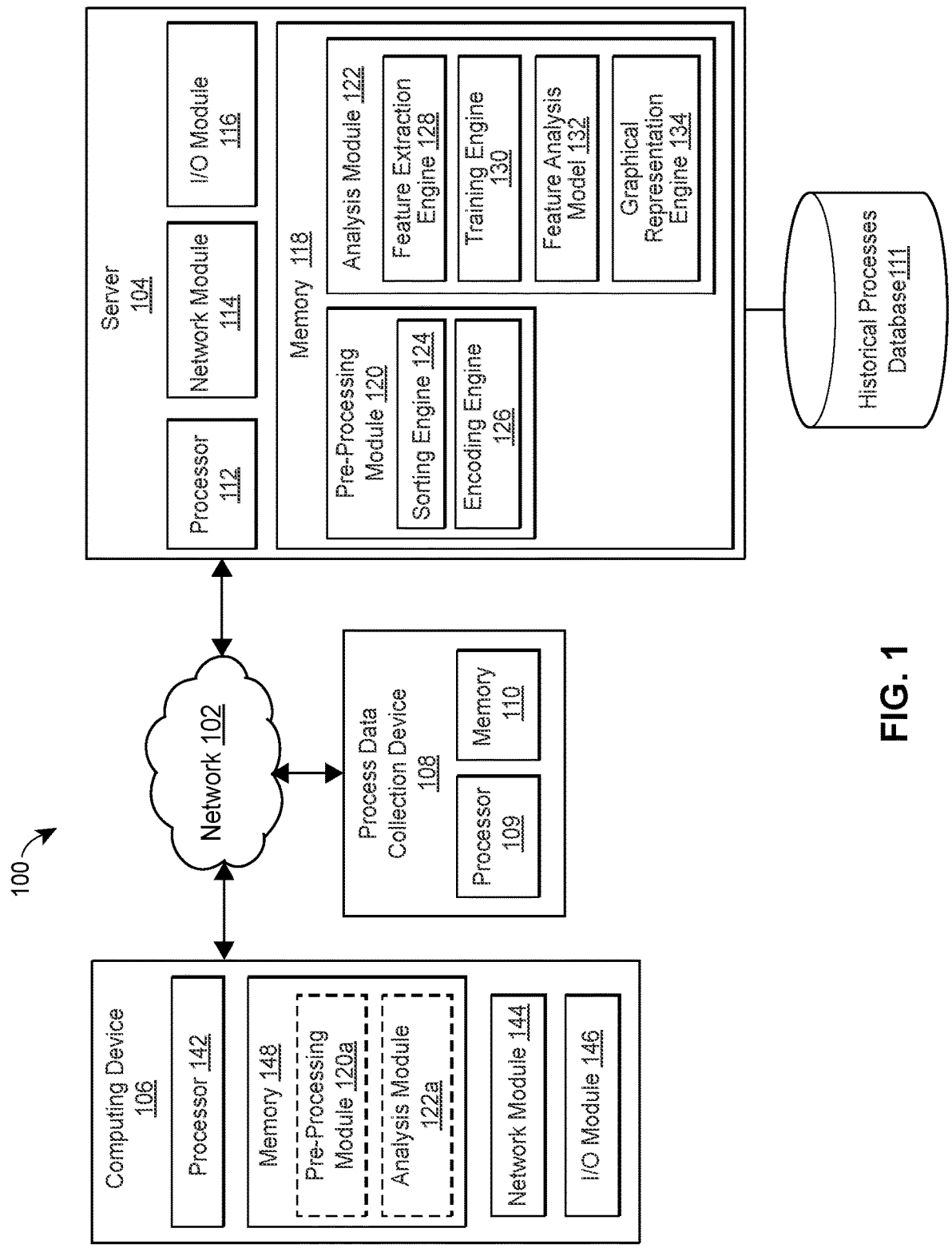
FIG. 1 depicts an example computing system for preparing unstructured data for analysis, and analyzing the prepared data using a variety of analytical techniques.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

Techniques, systems, apparatuses, components, devices, and methods are disclosed for preparing unstructured data for machine learning and/or statistical analysis. More particularly, the techniques of this disclosure can be used to analyze data representing processes (i.e., process data). As used herein, a process can be any series of events. For example, a process in the field of insurance may include a claims process, starting with a first notice of loss, continuing with processing events such as claim investigation, policy review, damage evaluation, repairs, payment, and ending with resolution of the claim. As another example, a process in the healthcare field may include a patient-related process, starting with intake of the patient, continuing with patient care events (e.g., seen by doctor, moved to different room, test performed), and ending with discharge of the patient.

Process data for multiple instances of a type of process (e.g., multiple claims, where each claim is an instance of an insurance claims process, or multiple patient event flows, where each patient event flow is an instance of a patient process for different patient), or multiple processes, may be collected. Process data generally includes data regarding the events in a process, for multiple instances of that process (e.g., several different claims). For each event, an entry, which can be referred to as an event record, may be included in the process data identifying (a) an identifier for the instance of the process (e.g., a claim identifier, identifying a particular claim), (b) a description of the event (e.g., first notice of loss, vehicle arrived at repair shop, new image of vehicle received, repair estimate amount received, referred for subrogation etc.), (c) a timestamp indicating a time that the event took place, and (d) possibly additional information (e.g., a repair estimate amount). The description of the event, and the additional information, may be in the form of unstructured strings. Further, process data may include event records for multiple instances of one or more processes in unstructured orders (e.g., not structured chronologically, by process, by process instance, or any other ordering scheme). Accordingly, at least a portion of the collected process data is unstructured.

After receiving process data, the computing system described herein can pre-process the process data so that the resulting data can be analyzed using a desired analytical technique. Pre-processing the process data may include sorting the event records by identifier, and by timestamp, to determine, for each instance of a process, a time-ordered sequence of events. The descriptions, and possibly additional information, for each time-ordered sequence of events can then be converted into a sequence of electronic characters, such as emojis, unicode symbols, or other sequences of an alphabet (which may be an alphabet comprised of textual letters, symbols, or graphical icons). A resulting sequence of electronic characters illustrates which events occurred during a process and in what chronological order.

Converting unstructured process data into these sequences of electronic characters has numerous benefits for the field of process mining. A human user, for example, cannot gain insight from unstructured process data simply by viewing the process data on a display. However, a human user can see patterns in the process data when the process data is represented as sequences of electronic characters. Further, sequences of emojis, for example, can be more easily understood by a human user than sequences of numbers or letters, enabling a human user to quickly identify patterns when the process data is visualized as emoji sequences. Thus, by converting unstructured data to emoji sequences, the disclosed techniques enable improved semantic processing by a human viewer. Moreover, the sequences of electronic characters can be analyzed using statistical and/or machine learning techniques, because the sequences are in a structured, known format. Accordingly, the disclosed techniques enable algorithms to analyze data that previously could not be analyzed, or was impracticably difficult to analyze, by a machine.

In addition to generating the above-discussed sequences of electronic characters, this disclosure also discusses techniques for analyzing the resulting sequences and generating graphical representations of sequences and/or clusters of sequences, where use of these techniques is enabled by the electronic character representation.

As one example, because the events of a process are represented as characters of an alphabet (e.g., emojis of a set of emojis), differences between instances of a process can be quantified. For example, distances between sequences of characters can be calculated using a distance metric (e.g., a Levenshtein metric, as will be explained in further detail below). These distances can then be used to find clusters of similar processes using unsupervised machine learning. Clusters can then be analyzed to improve understanding of events. For example, a cluster having a certain pattern of events may be identified as having a particular characteristic, enabling determination of a relationship between the pattern of events and the characteristic (e.g., a certain pattern of insurance claim processing events, sharing the characteristic of a long claim processing time). Moreover, these clusters can be visualized using graphical representations that enable determination of additional insights. An example graphical representation technique, a pixel painting algorithm, is discussed in further detail below.

As another example, sequences of characters can be analyzed using machine learning techniques, and/or can be used as training data for machine learning models. For example, sequences of characters representing instances of a type of process can be used as training data to train a machine learning model to make predictions regarding other processes of that type. During training, relationships between certain events, patterns of events, and combinations of events can be mapped to particular characteristics.

Example Computing System

FIG. 1 depicts an example computing system 100 in which the techniques of this disclosure for preparing unstructured data for analysis and analyzing the prepared data using a variety of analytical techniques may be implemented. The computing system 100 includes several computing devices communicatively coupled via a network 102. The computing devices of the computing system 100 may include: a server 104, a computing device 106, an process data collection device 108, and a historical processes database 111. Although FIG. 1 illustrates only a single example of each device for simplicity, it should be understood that any suitable number of devices 111, 104, 106, 108 may be included in the computing system 100, as will be further described below. Further, it should be understood that while a computing device may be described, for simplicity, as including "a processor," and/or "a memory," the computing device may include one or more processors and/or one or more memories.

The network 102 in general can include one or more wired and/or wireless communication links via which the components of the computing system 100 can communicate with each other, and may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMax, Wi-Fi, Bluetooth, and others). The network 102 may be a proprietary network, a secure public internet, a virtual private network, or some other type of network, such as dedicated access lines, telephone lines, satellite links, cellular data networks, combinations of these, etc. Where the network 102 comprises the Internet, data communications may take place over the network 102 via an Internet communication protocol.

As will be described in further detail below, the computing system 100 (or, more particularly, the server 104 and/or the computing device 106) may be configured to analyze process data (i.e., data relating to one or more processes). As described above, process data generally includes data regarding the events in a process (e.g., an insurance claims process), for multiple instances of that process (e.g., several different claims). For each event, an entry, which can be referred to as an event record, may be included in the process data identifying (a) an identifier for the instance of the process (e.g., a claim identifier, identifying a particular claim), (b) a description of the event (e.g., first notice of loss, vehicle arrived at repair shop, new image of vehicle received, repair estimate amount received, referred for subrogation etc.), (c) a timestamp indicating a time that the event took place, and (d) possibly additional information (e.g., a repair estimate amount). The description of the event, and the additional information, may be in the form of unstructured strings. Further, process data may include event records for multiple instances of one or more processes in unstructured orders (e.g., not structured chronologically, by process, by process instance, or any other ordering scheme). Accordingly, at least a portion of the collected process data is unstructured.

The server 104 and/or the computing device 106 may receive process data from the process data collection device 108, and/or from the historical processes database 111. The process data collection device 108 may be a computing device, including a processor 109 and a memory 110. The processor 109 can include one or more general-purpose processors (e.g., central processing units (CPU(s)) or special-purpose processing units capable of executing machine-readable instructions stored on the memory 110. The memory 110 may be a non-transitory memory and may include one or several suitable memory modules, such as random access memory (RAM), read-only memory (ROM), flash memory, other types of persistent memory, etc.

The process data collection device 108 may be configured to receive and collect process data from external data sources. For example, in the context of insurance claim processes, the process data collection device 108 may collect claims data from an insurance enterprise (e.g., from an enterprise claims system (ECS)). Example claims data may include information collected from a user, such as a claims handler, a claims adjuster, a customer, a field investigator, etc., and may include suitable information for claims processing, such as property information/attributes (e.g., vehicle identification, home description, etc.), an insured profile (e.g., name, address, telephone, etc.), billing information, a witness statement, a photograph or video, a first notice of loss, an accident description, a medical bill, an interview, an electronic health record, event logs or event records, etc.

The process data collection device 108 may receive raw data (i.e., not formatted as event records), or may receive event records. In implementations in which the process data collection device 108 receives raw data, the process data collection device 108 may format the raw data as event records. For example, the process data collection device 108 may receive the raw data, identify events included in the raw data, and extract, for each event, the information described above (i.e., (a) an identifier for the instance of the process, (b) a description of the event, (c) a timestamp, and (d) possibly additional information. The process data collection device 108 can then generate event records for each event included in the raw data. Event records may be stored in the form of rows of a table (e.g., a table including at least four columns (a)-(d)), or in any suitable data structure.

The process data collection device 108 may store the event records in the memory 110, and transmit or push event records to the computing device 106 and/or the server 104 (e.g., in response to a request or as part of a scheduled push). Further, the process data collection device 108 may store event records in the historical processes database 111. The historical processes database 111 is configured to store event records for historical (i.e., past) processes, such that the event records are accessible by the server 104, and, in some implementations, the computing device 106. The historical event records included in the historical processes database 111 may be used as training data to train a machine learning model, as discussed in further detail below. Accordingly, in addition to the event records themselves, the historical process database 111 may also store additional data regarding each event and/or process, where this additional data can be used as labels during training of the machine learning model. Generally speaking, labels can correspond to desired outputs of the trained machine learning model. For example, a label may be the amount of time the process took (either a precise amount or a range, such as "short," "average," or "long"), such that the labeled training data can be used to train a machine learning model to predict how long a process will take. The historical processes database 111 may utilize any known database architecture. Further, the historical processes database 111 may be implemented using cloud technology and may reside on a distributed network of computing devices rather than a single computing device.

The server 104 may be configured to implement the techniques of this disclosure for pre-processing process data, analyzing the processed data, and generating graphical representations. The server 104 may include a processor 112 and a memory 118, which may be similar to the processor 109 and the memory 110, respectively. The server 104 may also include a network module 114 configured to communicate data via the network 102. The network module 114 may include one or more transceivers (e.g., WWAN, WLAN, and/or WPAN transceivers) functioning in accordance with IEEE standards, 3GPP standards, or other standards, and configured to receive and transmit data via one or more external ports. The server 104 may also include an input/output (I/O) module 116, which may include hardware, firmware, and/or software configured to receive inputs from, and provide outputs to, the ambient environment and/or a user. The I/O module 116 may include a touch screen, display, keyboard, mouse, buttons, keys, microphone, speaker, etc.

In various implementations, the server 104 may include fewer components than illustrated in FIG. 1, or, conversely additional components. While the server 104 is depicted as a single device, the server 104 may include multiple computing devices. Further, the functions of the server 104 may be distributed among different computing devices, not only residing within a single machine, but deployed across a number of machines. For example, in some embodiments, the server 104 may comprise multiple servers, which may comprise multiple, redundant, or replicated servers as part of a server farm. In some embodiments, the server 104 may be implemented as cloud-based servers, such as a cloud-based computing platform. For example, the server 104 may be any one or more cloud-based platform(s) such as MICROSOFT AZURE, AMAZON AWS, or the like.

The memory 118 may store instructions for implementing a pre-processing module 120 and an analysis module 122. The pre-processing module 120 receives process data (e.g., from the process data collection device 108 or the historical processes database 111) and pre-processes the process data in order to prepare the process data for analysis by the analysis module 122. The pre-processing module 120 may include a sorting engine 124 and an encoding engine 126. The sorting engine 124 may include functions for sorting process data (i) by identifier, and (ii) by timestamp. Accordingly, the sorting engine 124 receives process data including event records, and returns, for each process reflected in the event records, the events included in each process, and the chronological (i.e., time-ordered from earliest to latest) order of those events. The encoding engine 126 includes functions for, based on the output from the sorting engine 124, analyzing the descriptions and additional information included in the event records to generate, for each process, a sequence of electronic characters representing the events in the process, where each electronic character in the sequence represents an event, and the order of the sequence reflects the time-ordering of the events. For example, if a time-ordered sequence of events includes (1) first notice of loss, (2) claim investigation, (3) reimbursement issued, and (4) claim resolved, an example electronic sequence would have four characters, a first character representing first notice of loss, a second character representing claim investigation, a third character representing reimbursement issued, and a fourth character representing claim resolution.

The encoding engine 126 may include, or retrieve from a memory (e.g., the memory 118) alphabets (i.e., sets) of electronic characters, where the encoding engine 126 can utilize electronic characters from one of these alphabets, depending on the implementation, to encode the time-ordered sequences of events. For example, a first implementation may utilize emojis of a set of emojis (e.g., emojis included in Unicode emojis). A second example implementation may utilize letters of the Latin alphabet. While this disclosure primarily provides examples of emoji sequences, other alphabets (i.e., sets) of electronic characters can also be used to implement the techniques of this disclosure. The encoding engine 126 also includes functions for mapping the alphabet from the utilized alphabet to event descriptions, such that particular events or types of events map to a character of the alphabet. To determine to which character an event maps, the encoding engine 126 may apply a rule-based algorithm (e.g., including rules mapping events to characters), and/or natural language processing (NLP) techniques, including machine learning, depending on the complexity of the event descriptions. For example, the encoding engine 126 may use an NLP model to classify an event, based on analysis of the event description and possibly any additional information included in the event record, into categories, each category mapped to a character.

Such an NLP model may perform syntactic analysis and/or semantic analysis to categorize events. Syntactic analysis generally involves analyzing text using basic grammar rules to identify overall sentence structure, how specific words within sentences are organized, and how the words within sentences related to one another. Syntactic analysis may include one or more sub-tasks, such as tokenization, part of speech (PoS) tagging, parsing, lemmatization and stemming, stop-word removal, and/or any suitable sub-task or combinations thereof. Semantic analysis generally involves analyzing text in order to understand and/or otherwise capture the meaning of the text. In particular, an example NLP model applying semantic analysis may study the meaning of each individual word contained in a textual transcription in a process known as lexical semantics. Using these individual meanings, the NLP model may then examine various combinations of words included in the event description (and any additional information) to determine one or more contextual meanings of the words. Semantic analysis may include one or more sub-tasks, such as word sense disambiguation, relationship extraction, sentiment analysis, and/or any other suitable sub-tasks or combinations thereof. For example, the encoding engine 126 may apply an NLP model to generate interpretations of the event descriptions, and, based on the interpretation, classify the event into a category that maps to a character. An NLP model may include an artificial intelligence (AI) or machine learned algorithm trained using a plurality of textual event descriptions to classify events into categories.

Thus, the pre-processing module 120 operates on input including one or more event records, and outputs, for each instance of a process included in the event records, a sequence of electronic characters representing a time-ordered sequence of events during the instance of the process. These sequences of electronic characters are then provided to the analysis module 122. The one or more event records may be a collection of historical event records (e.g., from the historical processes database 111), or event records received from the process data collection device 108.

The analysis module 122 may include a feature extraction engine 128, a training engine 130, a feature analysis model 132, and/or a graphical representation engine 134. The feature extraction engine 128 is configured to generate, based on the sequences of electronic characters, feature vectors, or logical groupings of parameters or attributes associated with each sequence of electronic characters. For example, the feature extraction engine 128 may generate a feature vector x, where the values of the feature vector x (i.e., feature values) are parameters or attributes of a particular sequence of electronic characters. The features included in a feature vector may vary depending on the implementation. Example features include the number of occurrences of a character in the sequence, the location of a character (or group of characters) in the sequence, the locations of a character (or group of characters) in the sequence relative to another character (or group of characters) in the sequence, the presence/number of occurrences of certain patterns of characters (e.g., n-grams, corresponding to a pattern of n characters), the length of a sequence, etc.

Further, the features for a particular sequence of electronic characters may depend on the space of sequences being analyzed. An example feature may be a distance from one sequence to another sequence (i.e., a quantitative measure of the similarity between two sequences). Given a set of sequences (e.g., sequence S1, sequence S2, sequence S3), the feature extraction engine 128 may calculate, for each particular sequence, the distance between the particular sequence and the other sequences in the set, and include those distances in a feature vector. For example, a feature vector for S1 may include feature values d1 and d2, with d1 corresponding to the distance between S1 and S2, and d2 corresponding to the distance between S1 and S3. Additionally or alternatively, given a certain sequence, a feature vector for S1 may include the distance between S1 and the certain sequence; feature vectors for S2 and S3 may also include the distance between S2 and S3, respectively, and the certain sequence. An example distance metric is a Levenshtein metric. The Levenshtein distance between two sequences is the minimum number of single character edits (e.g., insertions, deletions, or substitutions) that must be made to transform one sequence into another sequence. Transformation of event records into sequences of electronic characters enables use of a distance metric such as the Levenshtein distance to compare processes. Distances between sequences can be used as input for a clustering algorithm, described below with reference to the feature analysis model 132 in the context of unsupervised machine learning.

The feature analysis model 132 may include one or more models configured to take as input feature vectors from the feature extraction engine 128 and provide output such as predictions regarding processes, clusters of processors, and/or other forms of desired output, depending on the implementation. In implementations in which the feature analysis model 132 utilizes machine learning, the analysis module 122 includes a training engine 130 to train the feature analysis model 132. The feature analysis model 132 may be a neural network, deep learning model, machine learning model, or other artificial intelligence model trained using historical process data (e.g., from the historical processes database 111). More particularly, historical processes data may first be pre-processed by the pre-processor module 120, output from the pre-processor module 120 (i.e., sequences of electronic characters) may be passed to the feature extraction engine 128, which generates feature vectors representing the processes included in the historical processes data. These feature vectors comprise a training set, which can then be passed to the training engine 130 for use in training the feature analysis model 132. Training the feature analysis model 132 may involve training the feature analysis model 132 using the training set to make predictions for new inputs (i.e., subsequent data representing new processes). For example, a gradient-based training algorithm (e.g., a stochastic gradient descent algorithm), supervised learning, unsupervised learning, reinforcement learning, or any other suitable training may be applied to train the feature analysis model 132.

In supervised machine learning, for example, the feature analysis model 132 may be trained using training data that includes both the feature vectors generated using historical process data and labels associated with the processes in the historical process data. The labels map input to associated, or observed, outputs of the feature analysis model 132. This enables the feature analysis model 132 to determine or discover rules and relationships that map inputs to outputs, so that, when subsequent novel inputs are provided (e.g., when the feature analysis model 132 is applied to new process data including event records for one or more instances of one or more processes), the feature analysis model 132 can accurately predict the correct output. The feature analysis model 132 may determine and/or assign weights to given feature values. The feature analysis model 132 is thus trained to determine mappings that predict, based on given feature values of a sequence, characteristics of the process corresponding to that sequence. For instance, as mentioned above, the feature analysis model 132 may be trained using historical process data including events during a plurality of insurance claim processes and labels identifying characteristics of those insurance claim processes (e.g., how long the insurance claim process took, customer satisfaction, etc.). The feature analysis model 132 can determine features (e.g., patterns within the sequences of electronic characters) that correspond to such labels. Identified patterns of events can then be mapped, from the electronic character representation, back to the event description (e.g., using the functions of the encoding engine 126 mapping an alphabet to event descriptions). For example, a pattern of three rabbit emojis in a row may be determined, by the trained feature analysis model 132, to correspond to a particular characteristic of a process. The feature analysis model 132 (e.g., by calling functions of the encoding engine 126) can determine that the rabbit emoji corresponds to a particular event description (e.g., investigation by claims adjuster), indicating that a sequence of three events having that event description leads to the process having the particular characteristic. Accordingly, the feature analysis model 132 is trained to discover mappings that predict, based on input process data, characteristics of a process.

The performance of the feature analysis model 132 may be improved by training with additional/different sets of training data, and iteratively providing feedback to the feature analysis model 132. For example, a first set of historical processes data may be used to train, using supervised machine learning, a first instance of the feature analysis model 132. The first instance of the feature analysis model 132 may have a first set or error rates corresponding to a proportion of cases where the prediction is incorrect. A prediction can be classified as incorrect based on comparison of the prediction with the labels included in the first set of historical processes data. The analysis module 122 may include a feedback processing function that provides feedback data to the feature analysis model 132 to tune the feature analysis model 132. The feedback data may indicate the error rates and may include adjustment operations to improve the feature analysis model 132 (e.g., adjusted weights assigned to the various feature values). Thus, in future iterations, the feature analysis model 132 can take into account the feedback data to decrease the error rate of the predictions. Accordingly, after receiving the feedback data, the analysis module 122 can use a second set of historical processes data to train a second instance of the feature analysis model 132, where the second instance of the feature analysis model has reduced error rates compared to the first instance of the feature analysis model.

In unsupervised machine learning, the feature analysis model 132 may be required to find its own structure in unlabeled example inputs. For example, the feature analysis model 132 may develop a feature that separates sequences of electronic characters (which map to sequences of events) associated with "normal" processes (e.g., typical or average based on the training set), and sequences of electronic characters that are different from "normal," (e.g., outlier processes that may indicate problems present during the process).

As another example, the feature analysis model 132 may use an unsupervised learning algorithm to identify clusters of similar instances of processes. The clusters may indicate correlations in the sequences of electronic characters. Clustering algorithms generally group items according to the similarity of the items to one another, where similarity can be determined according to a similarity or distance metric, such as the Levenshtein metric discussed above. Transformation of event records into sequences of electronic characters enables calculation of distances between sequences using a distance metric, which in turn enables clustering techniques to be applied to the sequences of electronic characters. Those of skill in the art will readily appreciate that many clustering techniques exist, including, for example, a density-based spatial clustering of applications with noise algorithm (DBSCAN), an agglomerative clustering algorithm, or another hierarchical clustering algorithm. A K-means or T-distributed stochastic neighbor embedding algorithm (tSNE) may be used, in some embodiments. Multidimensional scaling and/or latent Dirichlet allocation (LDA) techniques may be applied in some embodiments. A goal of the clustering technique is to find clusters that are representative of common structures within the domain of analysis. For example, in the case wherein the present techniques are used to analyze insurance claims processes, a clustering technique may be used to identify clusters of claims that share a common pattern or sequence of events. Clusters identified using unsupervised learning can then be analyzed to determine mappings between patterns appearing in a particular cluster and outcomes. For example, the feature analysis model 132 may (i) identify clusters of processes using unsupervised learning, and (ii) use supervised learning to identify features shared by processes in a cluster that map to certain labels, thereby enabling future predictions based on identifying a process as belonging to a particular cluster.

In some cases, the feature analysis model 132 may utilize a rule-based approach instead of or in addition to machine learning techniques. The feature analysis model 132 may comprise pre-determined rules mapping features to particular outcomes. In general, the feature analysis model 132 may use machine learning, rule-based algorithms, or a combination of these to output a prediction regarding a process and/or identify clusters of processes, depending on the implementation.

In some implementations, the analysis module 122 also includes a graphical representation engine 134. The graphical representation engine 134 is configured to generate graphs, plots, or other visual representations of the sequences of electronic characters output by the pre-processing module 120 and/or output of the feature analysis model 134. For example, the graphical representation engine 134 may be configured to generate plots using a pixel painting algorithm (described in further detail below), using as input sequences of electronic characters classified into clusters.

The computing device 106 is communicatively coupled to the server 104, and may include a processor 142 and a memory 148. The processor 142 and the memory 148 may be similar to the processor 109 and the memory 110, respectively. The computing device 106 may further include a network module 144 and an I/O module 146, similar to the network module 114 and the I/O module 116. A user may interact with the I/O module 146 to provide inputs to the computing device 106 (e.g., to applications/modules of the computing device 106), and to perceive outputs of the computing device 106. In various implementations, the computing device 106 may include fewer components than illustrated in FIG. 1, or, conversely additional components.

Depending on the implementation, the computing device 106 may include processing capabilities and executable instructions necessary to perform some/all of the actions described herein with respect to the server 104. For example, the computing device 106 may include a pre-processing module 120a and/or an analysis module 122a (stored as instructions on the memory 148)) similar to the pre-processing module 120 and the analysis module 122, respectively. Accordingly, while many of the examples of this disclosure discuss the server 104 performing the pre-processing of process data, analyzing the encoded process data, and generating graphical representations, the computing device 106 is also capable of performing some or all of these functions, depending on the scenario.

Generally speaking, a user may interact with the computing device 106 to view data and graphical representations generated using the techniques discussed herein, as well as to modify/configure the pre-processing module 120, 120a or the analysis module 122, 122a. For example, after generating sequences of electronic characters, the server 104 may transmit these sequences to the computing device 106 for display on the user interface 150. As another example, the server 104 can transmit plots generated by the graphical representation engine 134 to the computing device 106 for display on the user interface 150. Still further, a user may utilize the computing device 106 to request analysis of particular data sets. The memory 148 may include instructions for implementing one or more applications for requesting data, analysis, and/or graphical representations from the server 104, configuring the pre-processing module 120 or 120a, and configuring the analysis module 122 or 122a.

Example Techniques for Preparing Process Data and Analyzing Prepared Data

Figure 2:
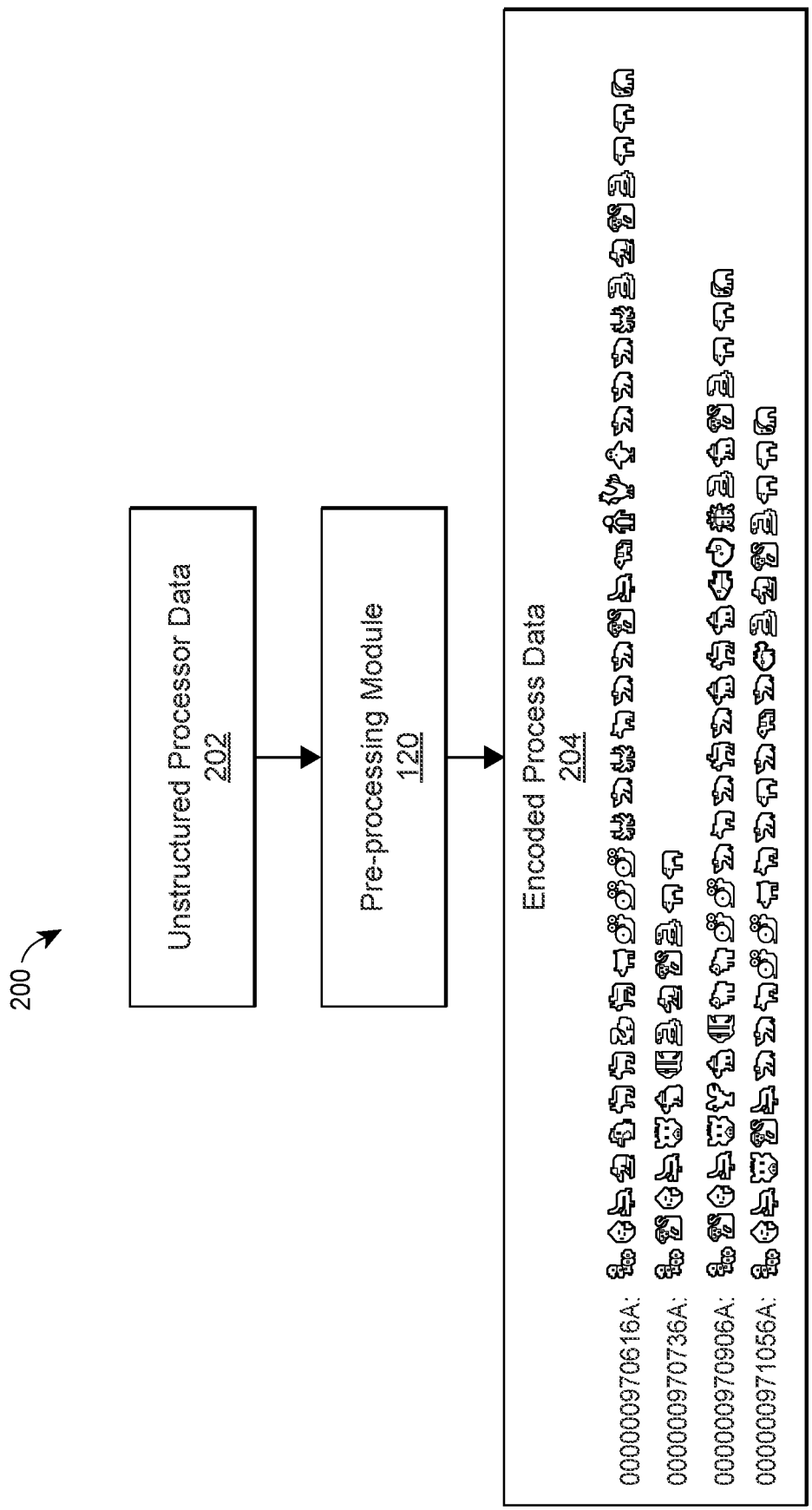
FIG. 2 is a block diagram depicting an example encoding of unstructured data into emoji sequences.

Turning to the example techniques of this disclosure, FIG. 2 is a block diagram 200 depicting an example encoding of unstructured data into emoji sequences. It should be understood that while FIG. 2 describes encoding into emoji sequences, the techniques of this disclosure can also be used to encode unstructured data into sequences of other types of electronic characters, such as other Unicode symbols, letters, numbers, or graphical icons. Further, throughout the description of FIG. 2, actions described as being performed by the server 104 may, in some implementations, be performed by the computing device 106 and/or by the server 104 and the computing device 106 in combination.

Initially, unstructured process data 202 is received at the server 104 (e.g., from the process data collection device 108 or the historical processes database 111). The process data 202 includes a plurality of event records for one or more instances of a process, each event record including (a) an identifier for the instance of the process, (b) a description of the event, (c) a timestamp indicating a time that the event took place, and (d) possibly additional information. As noted above, the process data 202 may be in the form of a table, or another suitable data structure capable of including the information (a)-(d) for a plurality of event records. An "instance of a process" and "instances of a process" may be referred to, respectively, for ease of description, as "a process" and "processes." For example, a claim is an instance of a type of process, an insurance claims process.

The pre-processing module 120 takes the process data 202 as input. The sorting engine 124 identifies, using the identifiers included in the event records, the events included in each process (i.e., in each instance of a type of process). The sorting engine 124 then orders the events, for each process, chronologically using the timestamps. The resulting output from the sorting engine 124 therefore includes, for each process included in the process data 202, a sequence of events ordered chronologically (i.e., time-ordered from earliest to latest). This output is passed to the encoding engine 126, which, using the techniques described above with reference to FIG. 1, encodes the event descriptions (and any additional information) for each event in the time-ordered sequence of events as an emoji. The resulting output from the encoding engine 126, illustrated as encoded process data 204, includes, for each process included in the process data 202, a sequence of emojis, each emoji representing an event in the process, and the emojis ordered in accordance with the time-ordered sequence of events (i.e., also ordered chronologically). The example encoded process data 204 includes four emoji sequences, one emoji sequence for each process included in the process data 202. For example, each emoji sequence may represent an insurance claim, where an insurance claim is an instance of an insurance claims process. Each insurance claim, for example, may begin with a first notice of loss event. A first notice of loss event is represented as a caterpillar emoji by the encoding engine 126. Accordingly, each of the four emoji sequences begins with a caterpillar emoji. The subsequent emojis represent different events during each claim. This encoded process data 204 can then serve as input for the analysis module 122. The emoji sequences may be displayed, as illustrated in FIG. 2, on a user interface (e.g., a display of the server 104 and/or the computing device 106, where the computing device 106 may receive the encoded process data 204 from the server 104). The emoji sequences can be illustrated as rows, with each row labeled using the identifier of the process (where, in FIG. 2, for each process, the identifier appears on the left of the encoded process data 204, followed by the emoji sequence).

Figure 3:
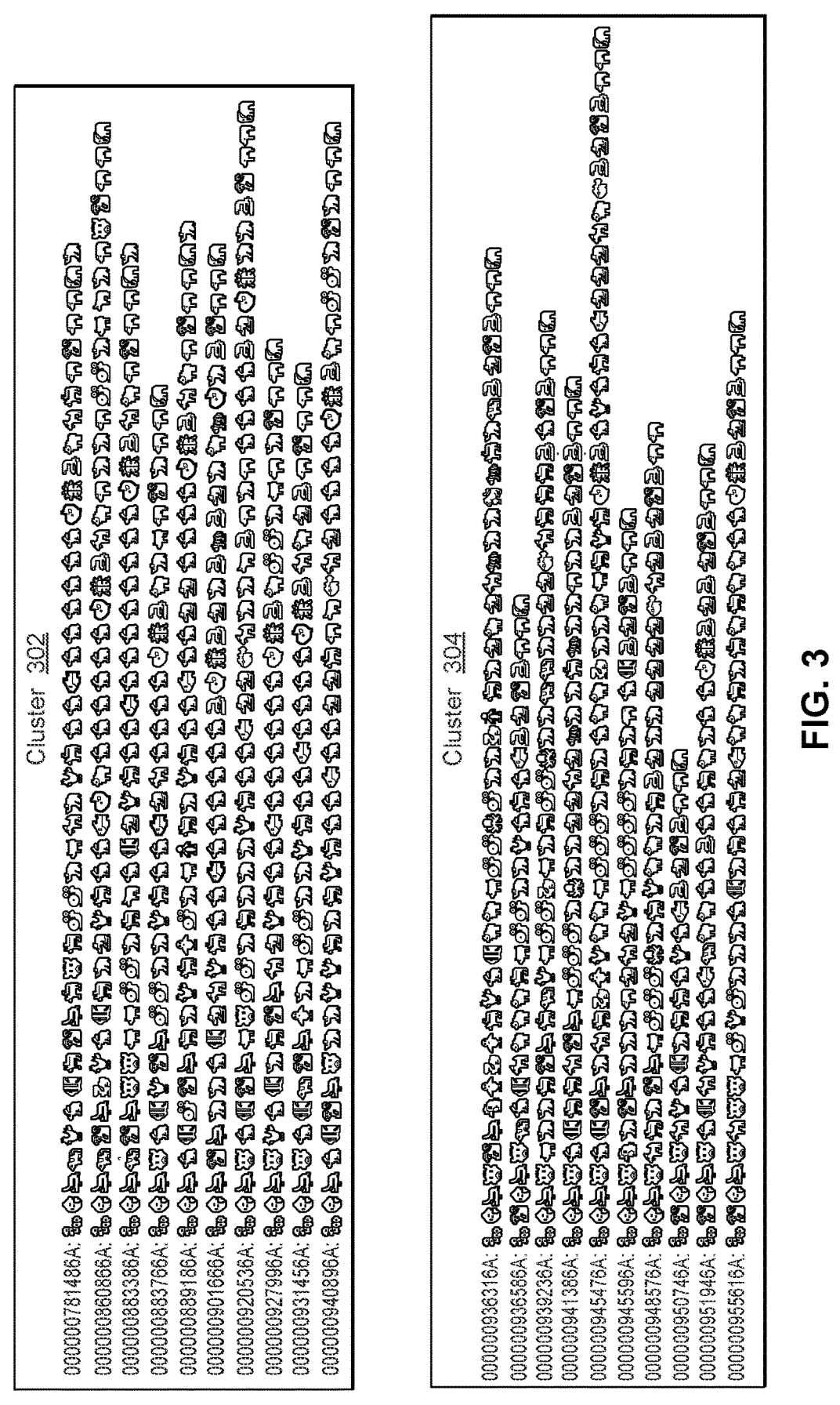

Turning to FIG. 3, FIG. 3 illustrates example output of the analysis module 122, in an embodiment. As noted in the description of FIG. 1, the analysis module 122 may be configured to provide different outputs, depending on the implementation. In the embodiment of FIG. 3, the analysis module 122 is configured to output clusters of emoji sequences determined to be similar. For example, a set of emoji sequences (generated by the pre-processing module 120), can be provided to the analysis module 122. The feature extraction engine 128 can operate on the set of emoji sequences to generate feature vectors, each feature vector corresponding to an emoji sequence. The feature vector for an emoji sequence may include distances (e.g., calculated using the Levenshtein metric) from the emoji sequence to the other emoji sequences in the set of emoji sequences. The feature vector may also include other features of the emoji sequence (e.g., the number of occurrences of an emoji in the sequence, the location of a emoji (or group of emojis) in the sequence, the locations of a emoji (or group of emojis) in the sequence relative to another emoji (or group of emojis) in the sequence, the presence/number of occurrences of certain patterns of emojis (e.g., n-grams, corresponding to a pattern of n emojis), the length of a sequence, etc. The feature analysis model 132 can then be applied to the feature vectors to identify, based on the feature vectors, clusters of emoji sequences. To identify the clusters, the feature analysis model 132 can utilize an unsupervised learning algorithm, as discussed above.

FIG. 3 illustrates two example clusters, cluster 302 and cluster 304. Emoji sequences included in the cluster 302 share a common pattern, several repeated rabbit emojis. These rabbit emojis are also generally accompanied by fish emojis. Presence of this common pattern likely resulted in the identification of the cluster 302. As in the case of the cluster 304, it may not be clear to a human viewer why emoji sequences are classified in the same cluster. The clusters 302 and 304 can then be further analyzed to determine additional information, such as a shared trait of processes included in each cluster.

For example, the feature analysis model 132 may include both (a) a first model configured to identify clusters, and (b) a second model configured to map clusters to predicted outcomes. The second model may be a machine learning model trained using supervised learning to determine, based on an input feature vector representing a process (or group of feature vectors), a predicted characteristic (i.e., a label) of that process. The second model can take as input feature vectors representing the emoji sequences in the cluster 302, and predict a characteristic of the processes represented by those emoji sequences. Accordingly, if a later process is identified as belonging to the cluster 302 or as having a pattern shared by the emoji sequences of the cluster 302, the analysis module 122 can determine that the later process also shares that characteristic.

Turning to FIGS. 4 and 5A-5C, these figures are used to describe an algorithm, referred to herein as a pixel painting algorithm, which may be utilized by the graphical representation engine 134 to generate graphical representations of emoji sequences and/or clusters of emoji sequences. The pixel painting algorithm (PPA) is a method for visualizing categorical values, where categorical values are characterized in that they are not suitable for performing arithmetic with them. "Painting" a pixel refers to plotting or coloring a coordinate on a graph. Categorical values can be, for example, characters of an alphabet, such as emojis. A sequence of categorical values can therefore be a string or sequence of characters of an alphabet. Advantageously, the pixel painting algorithm, taking as input a sequence of categorical values, creates a graphical representation of the sequence that effectively retains the information about the order in which the categorical values occurred. For example, from the generated graphical representation, it is possible to determine the frequencies of occurrence of any n-gram of characters. Some other forms of representing categorical values, such as histograms, do not retain information about the order in which the values occur. For example, when a frequency histogram is used to analyze a set of values, the number of times each value occurs is captured, but information about the order in which the values occur is lot. As another advantage, the graphical representations of different sequences produced using the PPA can also be used to compare the sequences.

The pixel painting algorithm can produce an image by painting pixels within a unit square. Coordinates on the square, i.e., x (horizontal axis) and y (vertical axis) coordinates, can be represented using finite precision floating point arithmetic in registers. Accordingly, a coordinate can be represented by register contents of $0.d_1d_2 \ldots d_k$, where k is the precision available. The available values of d depend on the base utilized. Using the base 10 representation, each $d_i$ will take on values from the set $\{0, 1, 2, \ldots, 9\}$. Using the base 7 representation, each $d_i$ will take on values from the set $\{0, 1, \ldots, 6\}$. When implementing the PPA, the graphical representation engine 134 may perform divisions and additions using coordinates represented as floating point numbers. To divide a floating point number by the base used in the representation of that number, the graphical representation engine 134 shifts the digits one position to the right, and inserts a zero in the vacated position. For example, when using a base 10 representation, the value ½ is represented by $0.5_{10}$, and one tenth of ½ is ¹⁄₂₀, represented as $0.05_{10}$. When using a base 2 representation, the value ½ is represented as $0.1_2$, one half of ½ is ¼, represented as $0.01_2$. Addition performed after such a division can be accomplished by pushing the added value into the vacated position caused by the right shift.

Turning to the PPA itself, the PPA creates an image defined by a sequence of categorical values (i.e., a sequence of electronic characters, the characters belonging to an alphabet). Each value is associated with a particular drawing action such as moving in a particular direction some number of units. Different sequences of values result in different images, such that each sequence of values can be thought of as a 'program' that draws the picture. When illustrating a sequence, the PPA begins at a starting point on the unit square, which can be configured depending on the implementation. The unit square is divided into landmarks, such that each character of the alphabet being utilized has a corresponding landmark. A landmark is an (x,y) coordinate on the unit square. Accordingly, from the starting point, the PPA determines the next "pixel," (i.e., the next point on the unit square) to "paint" (i.e., to plot or color) based on the first character in the sequence, the second character in the sequence, and so on. To paint the next pixel, the PPA relies on an update mechanism, which can depend on the landmarks and the number of rows and columns of landmarks defined on the unit square.

Figure 4:
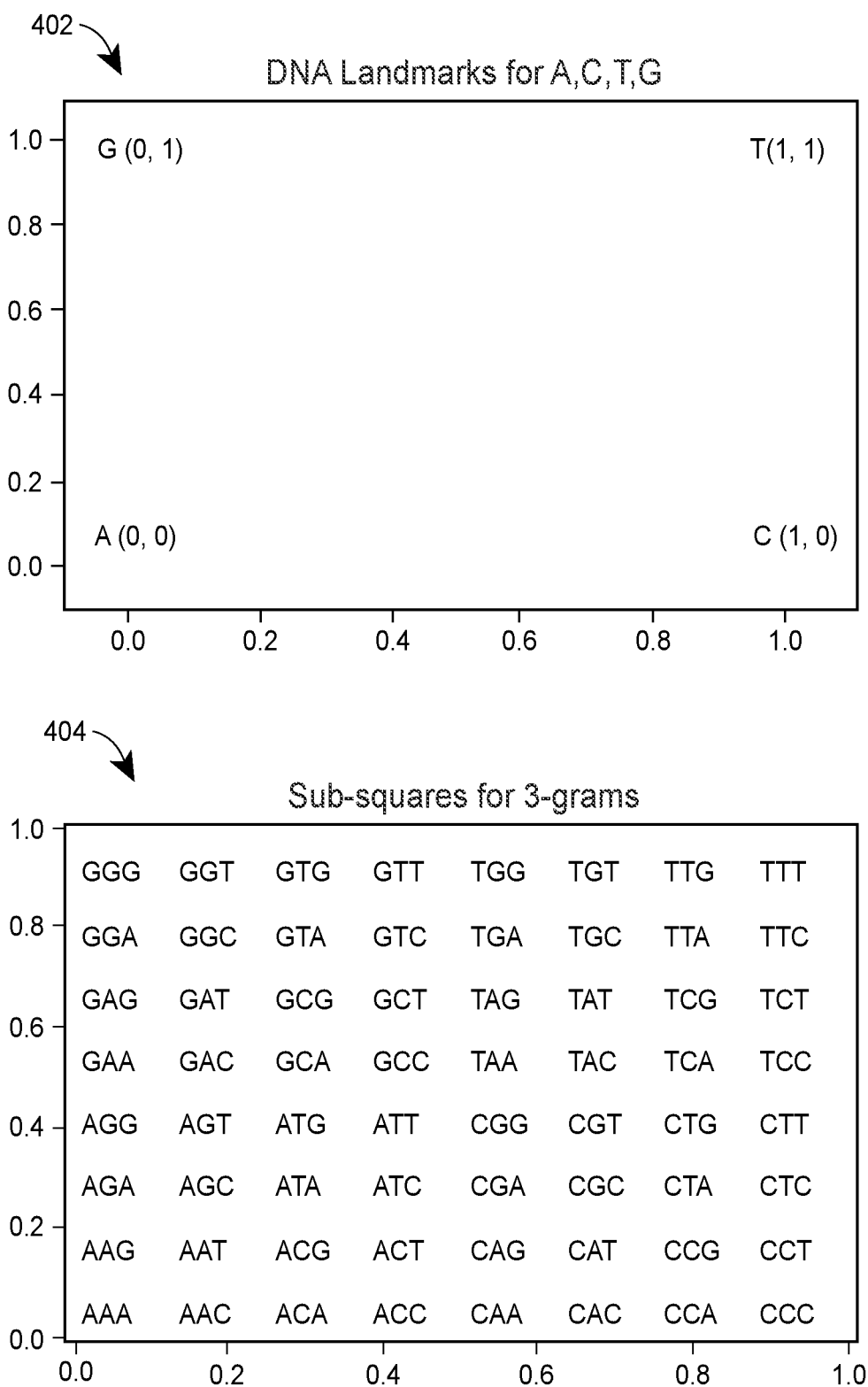
FIG. 4 illustrates an example graph identifying landmarks for plotting sequences using a pixel painting algorithm.

As a first example, this disclosure considers the PPA using a four-letter alphabet: C, A, G, and T. Such an alphabet exists in the context of DNA sequences, for example, which are made up of sequences of C, A, G and T. For this four-letter alphabet, four landmarks can be defined, one for each corner of the square. While in this example, the landmarks are placed at each corners, generally speaking, it is not necessary to distribute the letters in a particular pattern. Selected landmark locations do need to be consistent if comparing resulting images created using different sequences. In this example, the four landmarks are illustrated in FIG. 4 within graph 402, where the landmarks for A, C, G, and T correspond to (x,y) coordinates (0,0), (1,0), 0,1), and (1,1), respectively. Landmarks are used to determine in which direction the PPA should move when plotting the next character in the sequence. In the context of DNA sequences (i.e., four-letter alphabets), this plotting algorithm can be referred to as the Chaos Game Representation, CGR, for DNA sequences. However, as discussed in further detail below, this disclosure extends the PPA to alphabets of any size.

In the DNA sequences example, the starting point is configured as $P_0=(0.5,0.5)$, where $P_0$ refers to the starting pixel, and x-y coordinates (0.5,0.5) correspond to the center of the unit square). The next pixel to paint is the centroid between the current position and the landmark defined by the next character in the DNA sequence. Said another away, to determine the next pixel to paint, from the current pixel, move half way to the landmark defined by the next character. As a result, every painted pixel will consequently be in the interior of the unit square. Mathematically, which pixel to paint for the k-th character ($P_k$) can be expressed as:

$$P_k = \frac{1}{2}P_{k-1} + \begin{cases} (0.0, 0.0) & \text{if } t_k = A \\ (0.5, 0.0) & \text{if } t_k = C \\ (0.5, 0.5) & \text{if } t_k = T \\ (0.0, 0.5) & \text{if } t_k = G \end{cases}$$

This formula corresponds to the update portion of the PPA, for this four-landmark implementation. For a sequence CAT, the first painted pixel $P_1=(\frac{1}{2})*P_0+(0.5,0.0)=(0.75,$ 0.25). The second painted pixel $P_2=(\frac{1}{2})*P_1+(0.0,0.0)=$ (0.375,0.125), and the third painted pixel $P_3=(\frac{1}{2})*P_2+(0.5, 0.5)=(0.6875,0.5625)$.

When sequences (e.g., DNA sequences) are translated into an image using the PPA, similarities and differences between sequences can be seen by a human viewer, in a way not possible based on comparing the sequences themselves. Similarly, analytical techniques can also be applied to images generated using the PPA.

For example, from an image generated based on a sequence of characters using the PPA, the frequency of n-grams can be calculated for any n. In the four-letter alphabet case, the unit square can be divided into four congruent sub-squares. In a completed image generated using the PPA, the number of painted pixels in the lower left-hand sub-square is the number of A's in the sequence. Similarly, the number of painted pixels in each sub-square is equal to the number of occurrences of the character in the sequence. To calculate a number of n-gram occurrences, the unit square can be recursively subdivided n times. An example sub-division for 3-grams is illustrated in the graph 404, where each 3-gram is a 3-character combination of characters selected from A, C, T, and G. For example, to count the number of times that the three-gram "GAT" appears, the number of painted pixels in the sub-square of width $\frac{1}{8}$ (i.e., $1/(2^n)$) whose lower left hand corner is at $(0.001, 0.101)_2 = (0.125, 0.625)_{10}$. Three-gram frequency analysis of any three character combination can be performed by analyzing the 3-bit patterns occurring in the registers defining the x and y coordinates of the pixel being painted.

The DNA sequence example required four landmarks. However, the PPA of this disclosure is extended to any finite number N of categorical values, where N is the size of the alphabet. For such an extension, N landmarks are selected. In some implementations, landmarks are selected by picking N positions symmetrically throughout the unit square. In some implementations, landmarks can be selected based on the characters, which may provide additional information to a viewer of a PPA image. For example, landmark selection schemes can be used such as selecting the most frequently occurring characters (e.g., the most frequently occurring emojis, in an embodiment which an emoji alphabet is used), and placing these landmarks corresponding to the most frequently occurring characters on the outer edge of the unit square. Such a scheme would result in a PPA image in which outliers (i.e., less-commonly occurring characters) would appear closer to the center of the PPA image, drawing the viewer's attention to these outliers.

Figure 5A:
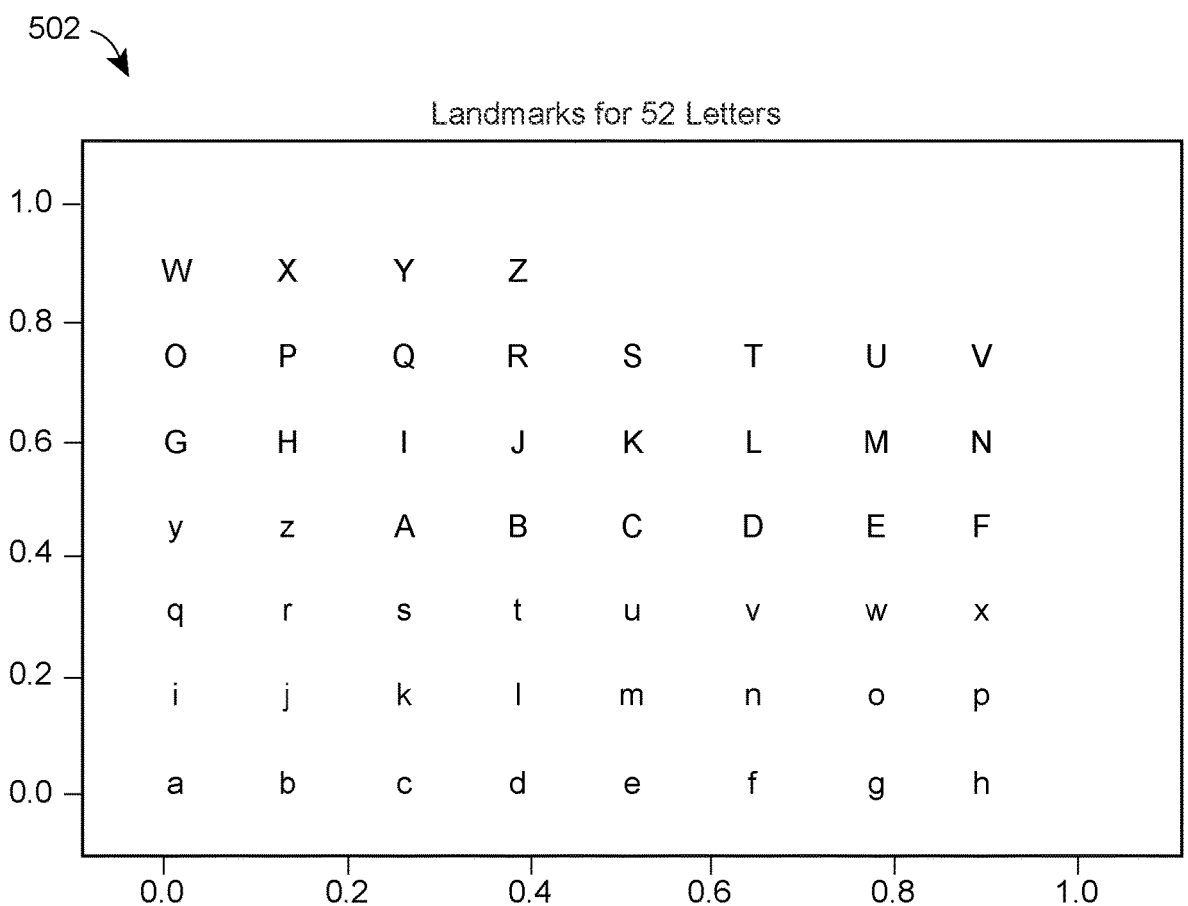
FIG. 5A illustrates an example graph identifying landmarks for plotting sequences of letters using the pixel painting algorithm.

For example, a Latin alphabet may include 52 letters, 26 uppercase letters and 26 lowercase letters. This example Latin alphabet therefore requires 52 landmarks. Turning to FIG. 5A, graph 502 illustrates landmarks corresponding to these 52 letters. The empty portion in the upper right corner is due to the fact that 52 is not a perfect square; the landmarks are thus distributed in a pattern that is as square as possible. The graph 502 includes eight columns in the x-direction, and seven rows in the y-direction. Indexing these rows and columns of landmarks, starting at zero, the representations of the positions in base 8 and 7 can be determined. For example, landmark "n" is in column 5 (the x-coordinate), and row 1 (the y-coordinate). Landmark "n" is therefore based on position $(0.5_8, 0.1_7)$.

In the Latin alphabet example, the update portion of the PPA is modified for the 52 landmarks. To paint a next pixel, the PPA captures information about the current position and moves a copy of that information to a position of the next landmark in the sequence. For this example, the captured current information is a modified copy of the vector from the origin to the current location. This vector from the origin to the current location shows, via its x-coordinate, what proportion of the total distance has been travelled from the left to the right hand side of the square. Similarly, the y-coordinate represents the proportion of the distance from the bottom to the top of the square. To ensure that the next pixel painted is within the landmark rectangle defined by the next character, the x-coordinate is divided by the number of columns of landmarks, and the y-coordinate is divided by the number of rows of landmarks. This corresponds to the right shift discussed above, performed on the x and y coordinate registers. The update recursion can then be described as "capture information, normalize, and then move to the next landmark."

Figure 5B:
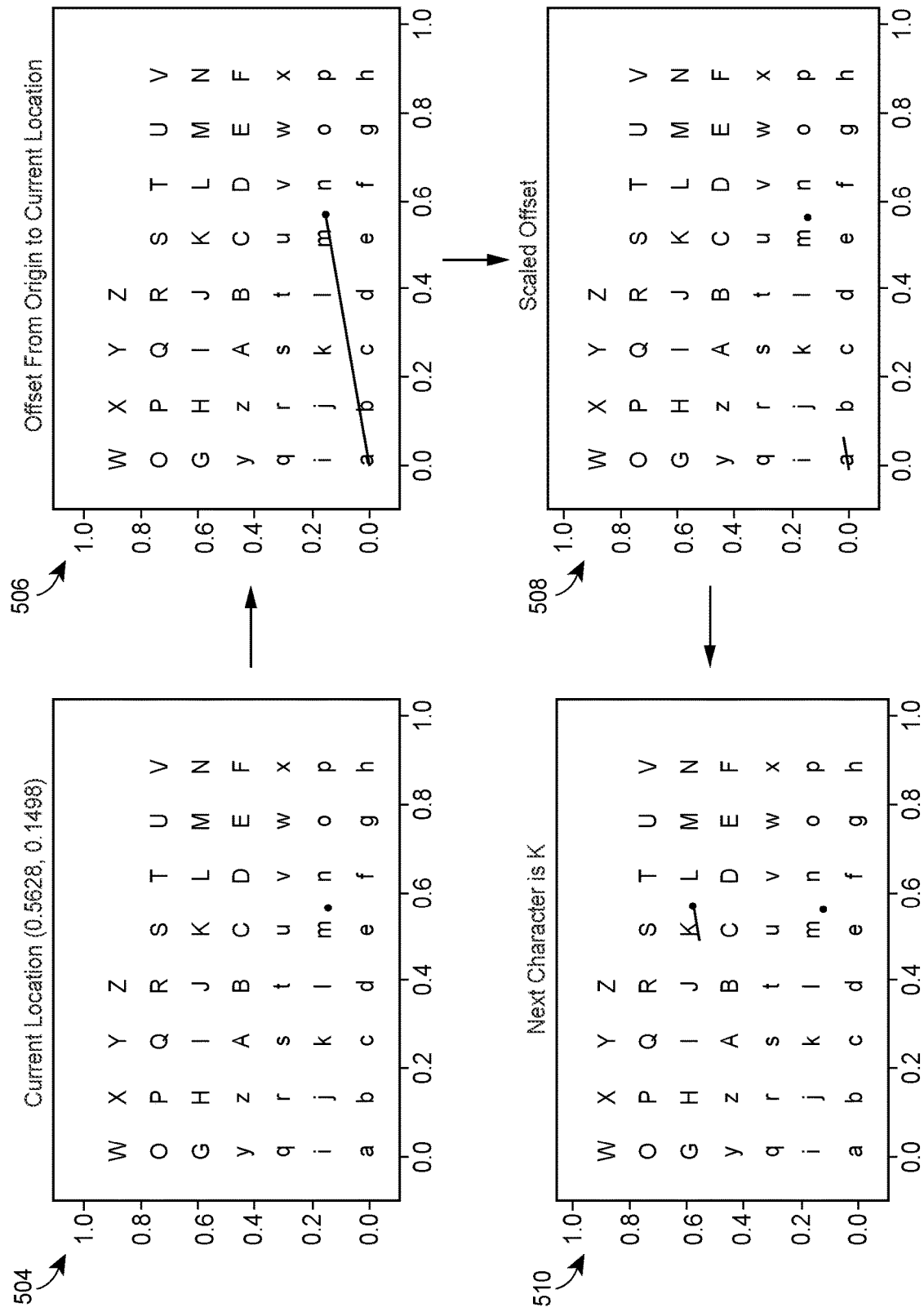
FIG. 5B illustrates a sequence of graphs indicating how sequential points may be plotted using the pixel painting algorithm.

FIG. 5B explains this update portion of the PPA, for the Latin alphabet example. Assume that the current pixel location is at (0.5628, 0.1498). The next character in the string being analyzed is "K." Graph 504 indicates the current pixel location. To paint the next pixel representing "K," first a vector from the origin to the current location is calculated. This vector is shown in graph 506, and represents the offset from the origin to the current location. Next, the x-coordinate of the current location is divided by 8.0 (the number of columns), and the y-coordinate is divided by 7.0 (the number of rows), to scale the vector to fit with any sub-rectangle. This scaled vector is shown in graph 508. Next, the scaled vector is translated to the landmark location defined by K, as shown in graph 510. The dot at the end of this translated, scaled vector, shown in graph 510, is the next pixel to be painted.

Figure 5C:
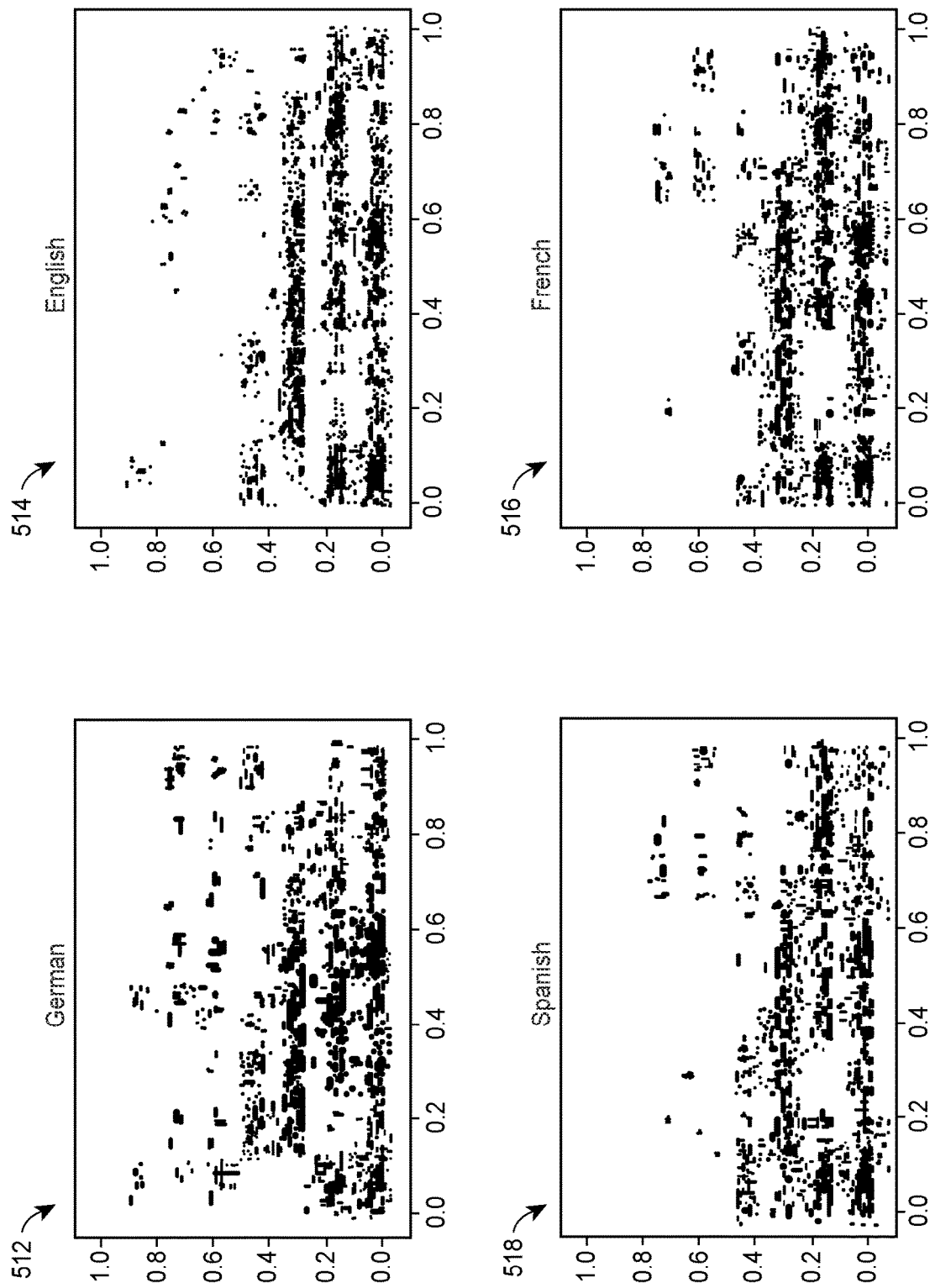
FIG. 5C illustrates example letter sequences as represented using the pixel painting algorithm.

FIG. 5C illustrates images produced by applying the PPA to the text of the Universal Declaration of Human Rights in four languages, which each utilize the Latin alphabet: German (graph 512), English (graph 514), French (graph 516), and Spanish (graph 518). Accordingly, each graph is produced by sequentially drawing pixels based on the order characters appear in the Universal Declaration of Human Rights. By analyzing the images, several differences can be seen. For example, the German document has more painted pixels in the upper half of the image than the graphs for other languages. This is because landmarks for the upper case letters are in the upper portion of image, and all proper nouns in German are capitalized. The Spanish and French documents have some bare spots around (0.3, 0.1), possibly because the letter "k" is rare in French and Spanish. There are also clusters around lower case landmarks, illustrating that vowels are more frequently used on a per character basis.

PPA images generated in this way can help to determine the language of a document. For example, the PPA could be used to determine the language of a document by plotting its PPA image and comparing it to the graphs 512, 514, 516, and 518 in FIG. 5C.

As described previously, an advantage of the PPA is that the PPA does not lose information concerning the underlying sequence. This can be seen through discussion of a pushdown stack. The analysis module 122 can store (e.g., in the memory 118) a data structure referred to as a pushdown stack. The pushdown stack is used to store lists of strings. The pushdown stack can also be referred to as a first in, last out (FILO) queue because the first item pushed on the stack is the last item emptied from the stack. By storing the encoding of the coordinates (i.e., the coordinates of each pixel) in a pushdown stack, the original sequence (i.e., the original sequence of characters) can be restored. Because there are two coordinates, x and y, for the Latin alphabet example, two pushdown stacks can be utilized, one for each coordinate. Consequently, there is effectively no loss of information when applying the PPA. Compared to other summary statistics, such as frequency histograms, the PPA provides an improved data analysis tool.

Figure 6:
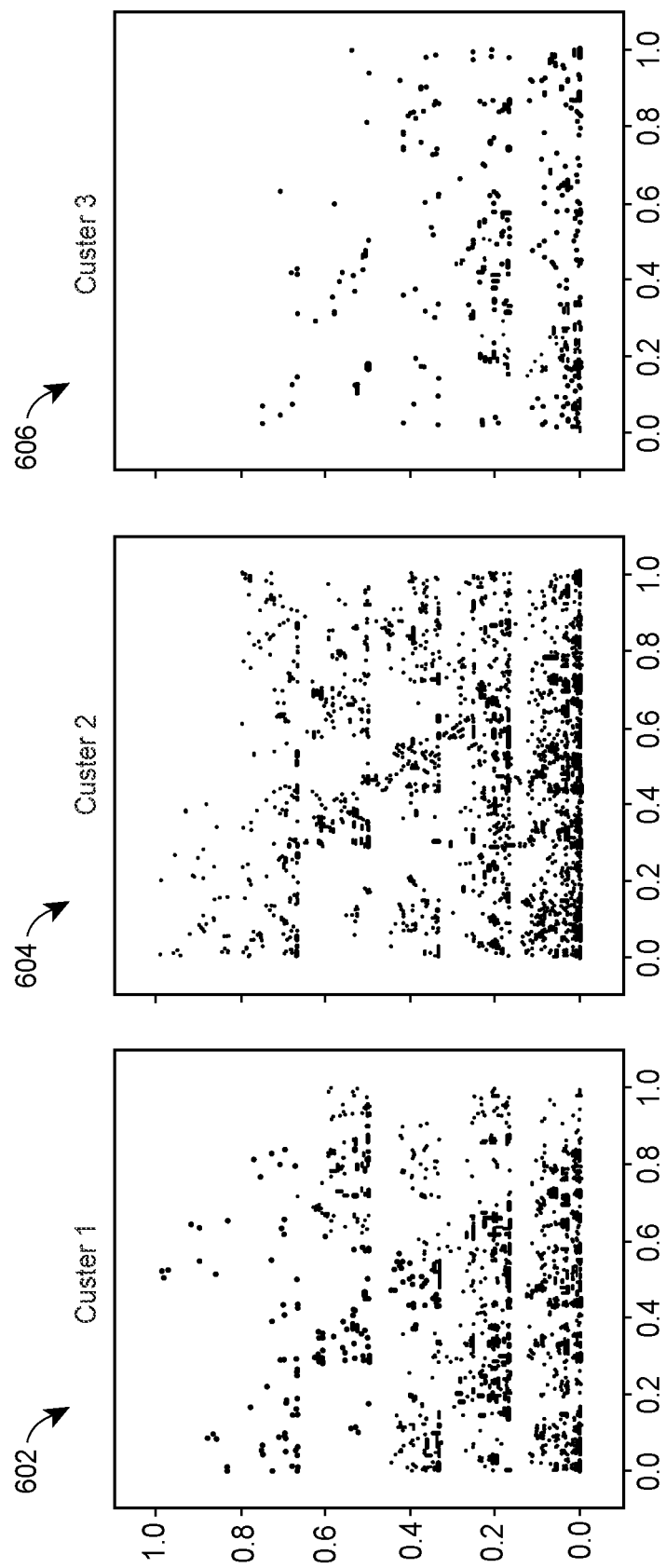
FIG. 6 illustrates example emoji sequence clusters as represented using the pixel painting algorithm.

In a similar manner as for the 52 character Latin alphabet example, landmarks can also be defined for any electronic character alphabet, such as an emoji alphabet. A similar update mechanism can also be defined for each alphabet. Returning to the emoji sequence examples discussed above (e.g., with reference to FIG. 2 and FIG. 3), the PPA can be used to visualize the emoji sequences included in respective clusters. FIG. 6 illustrates three graphs, 602, 604, and 606, each graph representing an image drawn by applying the PPA to sequences in different respective clusters. The graph 602, for example, may represent sequences included in the cluster 302. The graph 604 may represent sequences included in the cluster 304, and the graph 606 may represent sequences included in a different cluster. To generate the graph 602, the PPA can be applied to each emoji sequence in the cluster 302 (e.g., by sequentially applying the PPA to the first emoji sequence in the cluster 302, to the second emoji sequence in the cluster 302, and so on). Each of the clusters illustrated by graphs 602, 604, 606 have essentially the same number of events; differences in the images are therefore due to differences in the emojis and sequences of emojis included in the sequences, not to the number of events.

The graphs 602, 604, 606 do not identify multiple visits to a pixel. However, it should be understood that if coordinates of pixels can be represented with unlimited precision, no pixel would ever be painted over; in the case of finite precision, a pixel will be multiply painted due to round off error (if the corresponding character occurs sufficiently often). In some embodiments, the frequency of visits to a pixel or division can be recorded. For example, as discussed above with reference to n-grams, the unit square can recursively be subdivided, with the granularity of the subdivisions configurable based on the implementation. The number of times each subdivision is visited can be recorded, and used to color a heat map of the image to highlight and quantify visual clusters. Image processing techniques such as contour finding can be applied to such an image. As another example, a z-axis could be introduced into the PPA images, enabling measurement of how many times a pixel is visited. The resulting three-dimensional PPA image can be analyzed using topological data analysis techniques, which can enable finding connected components, wormholes, or other topological features. As a specific example, the z-axis can represent time. In such an example, the three-dimensional PPA image would show the evolution of the plotted sequence, with temporal sequencing explicitly represented.

The graphical representation engine 134 can also apply additional techniques to PPA images (e.g., PPA images generated based on a sequence or based on a cluster of sequences) to derive desired insights regarding the sequence(s) of events represented by the PPA image. For example, erosion and dilation transformations of morphological analysis can be applied to PPA images, which may provide noise reduction and image enhancement. Further, other machine learning techniques, such as recurrent or convolutional neural networks, can also be applied to generated PPA images. In such implementations, the feature extraction engine 128 can be applied to PPA images to extract features from the PPA images and generate feature vectors, and the feature analysis model 132 can be applied to the generated feature vectors to predict characteristics of the sequence(s) or cluster(s) illustrated in the PPA images. As yet another example, a distance metric can be defined to quantify similarities between PPA images. The pixel list of a PPA image (e.g., the list of pixels having length equal to the number of rows (nrows) by the number of columns (ncols) can be considered a single, one dimensional vector. The distances between pixels lists for different PPA images can then be calculated, and the similarity of PPA images quantitatively defined. In such an example, multiple PPA images can be calculated for a respective multiple sequences, and then the PPA images can be classified into clusters based on their distances from each other.

Referring now to the PPA more generally, as noted above, to implement the PPA, landmarks are defined for each character in an alphabet. To generate landmark locations for an alphabet of any size, the graphical representation engine 134 may implement instructions such as the pseudo code reproduced below:

```
function offsetdictfactory(alphabet,debug = False):

#     Returns a 2D offset dictionary for the alphabet of events used in the Pixel Painting
#   Algorithm of sequences composed of the characters in the input alphabet list.

#   Input:
#      alphabet   A list of unique characters

#   Output:
#      offsetdict   A dictionary whose keys are the characters of the alphabet, values are
#               the tuples (x, y) of coordinates in the Euclidean plane and the final
#               key, _base_, has a tuple giving the dimensions of the rectangle as
#               (ncols, mows)

sizeofalphabet = len(alphabet)
ncols = int(ceil(sqrt(sizeofalphabet)))
nrows = int(ceil(sizeofalphabet/ncols) )
nblanks = ncols*nrows - sizeofalphabet
offsetdict = new dictionary
for idx,event in enumerate(alphabet):
    col, row = divmod(idx, ncols)
    offsetdict[event] = (row/ncols,col/nrows)
offsetdict['_base_'] = (ncols, nrows)
return offsetdict
```

Further, to implement the PPA, an update mechanism is defined to determine the next pixel to paint, based on the next character in a sequence. The graphical representation engine 134 may implement instructions such as the pseudo code reproduced below to paint pixels, given a sequences of characters representing events of a process:

```
function computethepoints2plot(listofevents,definingoffsetdict):

#     Returns lists of the x and y coordinates of the image generated by the
#   input list of characters defined by the dictionary of offsets.

#   Input:
#      listofevents   A list of characters
#      definingoffsetdict The dictionary of offsets generated by the function
#      offsetdictfactory

#   Output:
#      xs, ys    The lists of the x and y coordinates of the image generated when the input
#               sequence of characters is used to generate the Chaos Game Representation of
#               the sequene using the dictionay of offsets. The two lists are typically
#               the first two arguments to the matplotlib scatter plot function.

# start at the origin
   xs = [0.0] ; ys = [0.0]
   base1 = definingoffsetdict['_base_'][0]
   base2 = definingoffsetdict['_base_'][1]
   for event in listofevents:
      currx = xs[-1]/base1; curry = ys[-1]/base2
      point = definingoffsetdict[event]
      xoffset = point[0]
      yoffset = point[1]
      nextx = currx + xoffset
      nexty = curry + yoffset
      xs.append(nextx)
      ys.append(nexty)
   return xs[1:], ys[1:]
```

Figure 7:
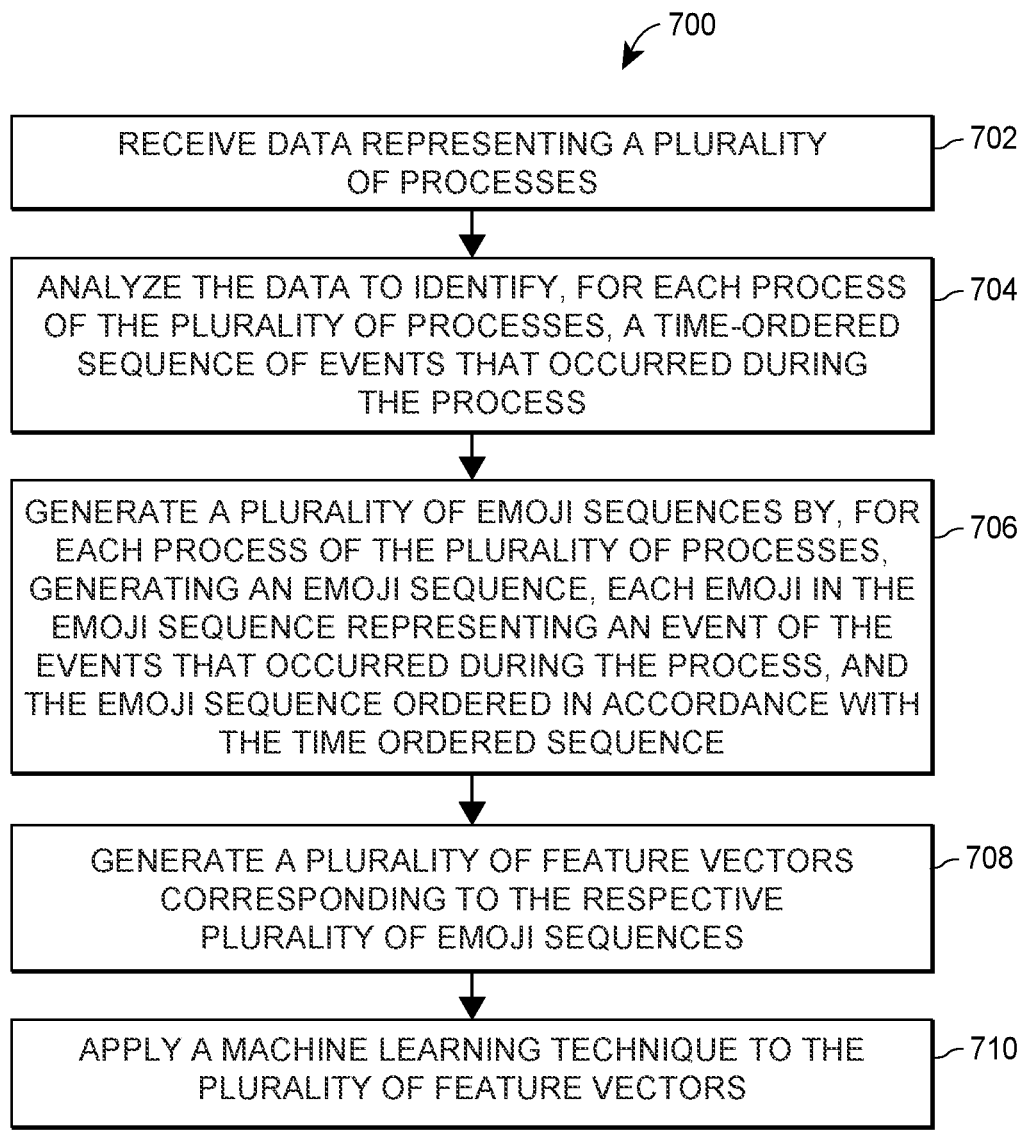
FIG. 7 is a flow diagram illustrating an example method for preparing unstructured data for machine learning analysis.

Referring next to FIG. 7, FIG. 7 illustrates an example method 700 for preparing unstructured data for analysis (e.g., machine learning and/or statistical analysis). The method 700 can be implemented as a set of instructions stored on a computer-readable memory and executable by one or more processors. For ease of explanation, the discussion below may refer to the server 104 as performing the steps of the method 700, but the method 700 can be implemented by the server 104, the computing device 106, or a combination of these devices.

At block 702, the server 104 receives data representing a plurality of processes. By "plurality of processes," block 702 refers to a plurality of instances of a type of process (e.g., a plurality of insurance claims, each insurance claim an instance of an insurance claims process). The server 104 can retrieve the data from the memory 118, the historical processes database 111, and/or the process data collection device 108. The data, which may be the process data discussed above, includes event records for the plurality of processes. Each event record may include: (a) an identifier for the instance of the process, (b) a description of the event, (c) a timestamp indicating a time that the event took place, and (d) possibly additional information.

At block 704, the server 104 analyzes the data to identify, for each process of the plurality of processes, a time-ordered sequence of events that occurred during the process (e.g., the actions of the sorting engine 124). Analyzing the data may include identifying the events during each process (e.g., based on the identifier of the process), and, for each process, identifying a time-ordered sequence of the events (e.g., based on the timestamp).

At block 706, the server 104 generates a plurality of emoji sequences by, for each process of the plurality of processes, generating an emoji sequence, each emoji in the emoji sequence representing an event of the events that occurred during the process, and the emoji sequence ordered in accordance with the time-ordered sequence (e.g., the actions of the encoding engine 126). Example emoji sequences are illustrated above as the encoded process data 204.

At block 708, the server 104 generates a plurality of feature vectors corresponding to the respective plurality of emoji sequences (e.g., the actions of the feature extraction engine 128). A feature vector includes parameters or attributes of the emoji sequence, such as the example features discussed above with reference to the feature extraction engine 128. In some implementations, generating the plurality of feature vectors includes, for each emoji sequence of the plurality of emoji sequences: calculating distances between the emoji sequence and the other emoji sequences of the plurality of emoji sequences, and including, in the feature vector, for the emoji sequence, the distances. Calculating the distances, for example, may include calculating the distances using a distance metric that measures a number of edits to transform a first sequence into a second sequence (e.g., using a Levenshtein metric). Additionally or alternatively, generating the plurality of feature vectors can include, for each emoji sequence of the plurality of emoji sequences, analyzing the emoji sequences to identify n-grams, where n is an integer greater than one, and where an n-gram corresponds to a pattern of n characters. An indication of the identified n-grams can be included in the feature vector for the emoji sequence.

At block 710, the server 104 applies a machine learning technique to the plurality of feature vectors. In some implementations, applying the machine learning technique includes analyzing the plurality of feature vectors to generate clusters of similar processes (e.g., clusters 302 and 304). In implementations in which the feature vectors include distances to other sequences, identifying the clusters may include determining the clusters at least in part based on the distances. To identify the clusters, the server 104 may apply a clustering algorithm configured to use unsupervised learning, for example.

The server 104 can visualized clusters of emoji sequences (or an individual emoji sequence) by generating a graphical representation for each cluster (or for an individual emoji sequence). The server 104 can render generated graphical representations on a user interface (e.g., by rendering the graphical representation on a user interface of the I/O module 116, or by transmitting the graphical representation to the computing device 106 for display on a user interface of the I/O module 146). Such a graphical representation can be generated using the PPA.

Emojis in the plurality of emoji sequences are selected from a set of emojis (e.g., an alphabet of emojis). To apply the PPA to an emoji sequence (or to a cluster of emoji sequences), the server 104 can assign, to each emoji in the set of emojis, coordinates of a graph having at least two dimensions (i.e., x,y coordinates). Assigning the coordinates can include generating landmarks for the set of emojis (e.g., using the pseudo code for generating landmarks included above). The PPA can then be used to plot points in the graph based on the emoji sequence (e.g., using an update mechanism, such as the pseudo code for the update mechanism described above). Graphical representations created using the PPA can be analyzed to determine additional insights. For example, n-grams included in a sequence can be identified from a PPA image of the sequence, by recursively subdividing the PPA image n times, and counting the number of pixels painted in a particular subdivision corresponding to the n-gram.

In some implementations, applying the machine learning technique includes training a machine learning model (e.g., training the feature analysis model 132 by the training engine 130) using the plurality of feature vectors. Training the machine learning model can include training the machine learning model to make a particular type of prediction, depending on the implementation. For example, if the plurality of processes correspond to a plurality of insurance claims, training the machine learning model may include training the machine learning model to predict a time duration for processing an insurance claim. In such implementations, if training the machine learning model includes training the machine learning model using supervised learning, labels of the event records/processes may be included in the data received at block 702.

The machine learning model may be trained using training data (e.g., a training set generated based on process data from the historical processes database 111). The trained machine learning model can be applied to data representing a subsequent process (i.e., a subsequent instance of the same type of process included in the training data) to make a prediction concerning that subsequent process. For example, the method 700 may further include receiving subsequent data (e.g., event records) representing the subsequent process, analyzing the subsequent data to identify a time-ordered sequence of events that occurred during the subsequent process (e.g., as described for block 704), generating an emoji sequence for the subsequent process (e.g., as described for block 706), each emoji in the emoji sequence ordered in accordance with the time-ordered sequence of events in the subsequent process, and applying the trained machine learning model to the emoji sequence.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A method for preparing unstructured data for machine learning analysis, the method comprising:
   receiving, by one or more processors, data representing a plurality of processes;
   analyzing, by the one or more processors, the data to identify, for each process of the plurality of processes, a time-ordered sequence of events that occurred during the process;
   generating, by the one or processors, a plurality of emoji sequences by, for each process of the plurality of processes, generating an emoji sequence, each emoji in the emoji sequence representing an event of the events that occurred during the process, and the emoji sequence ordered in accordance with the time-ordered sequence;
   generating, by the one or more processors, graphical representations of the plurality of emoji character sequences, the graphical representations including information about the order in which emojis occur in each emoji sequence;
   generating, by the one or more processors, a plurality of feature vectors corresponding to the respective plurality of emoji sequences, the plurality of feature vectors including information based on the graphical representations; and
   applying, by the one or more processors, a machine learning technique to the plurality of feature vectors.

2. The method of claim 1, wherein generating the plurality of feature vectors includes:
   for each emoji sequence of the plurality of emoji sequences:
      analyzing the emoji sequences to identify n-grams, wherein n is an integer greater than one; and
      including, in the feature vector for the emoji sequence, an indication of identified n-grams.

3. The method of claim 1, wherein applying the machine learning technique includes:
   training a machine learning model using the plurality of feature vectors.

4. The method of claim 3, wherein:
   the plurality of processes correspond to a plurality of insurance claims; and
   training the machine learning model includes training the machine learning model to predict a time duration for processing an insurance claim.

5. The method of claim 3, wherein the data is first data, the method further comprising:
   receiving, by the one or more processors, second data representing a first process;
   analyzing, by the one or more processors, the second data to identify a first time-ordered sequence of events that occurred during the first process;
   generating, by the one or processors, a first emoji sequence, each emoji in the first emoji sequence representing an event of the events that occurred during the first process, and the first emoji sequence ordered in accordance with the first time-ordered sequence;
   applying, by the one or more processors, the machine learning model to the first emoji sequence.

6. The method of claim 1, wherein generating the plurality of feature vectors includes:
   for each emoji sequence of the plurality of emoji sequences:

calculating distances between the emoji sequence and other emoji sequences of the plurality of emoji sequences; and including, in the feature vector for the emoji sequence, the distances.

7. The method of claim 6, wherein calculating the distances includes:

calculating the distances using a distance metric that measures a number of edits to transform a first sequence into a second sequence.

8. The method of claim 7, wherein calculating the distances includes:

calculating the distances using a Levenshtein metric.

9. The method of claim 6, wherein applying the machine learning technique includes:

analyzing, by the one or more processors, the plurality of feature vectors to generate clusters of similar processes.

10. The method of claim 9, wherein analyzing the plurality of feature vectors includes applying a clustering algorithm configured to use unsupervised machine learning to identify the clusters.

11. The method of claim 9, further comprising:

generating, by the one or more processors, for each cluster, a graphical representation of the cluster; and rendering, by the one or more processors, for each cluster, the graphical representation on a user interface.

12. The method of claim 11, wherein emojis in the plurality of emoji sequences are selected from a set of emojis, and, for each cluster of similar processes, generating the graphical representation includes:

assigning, to each emoji in the set of emojis, coordinates of a graph having at least two dimensions; and plotting, for each process of the similar processes, points in the graph based on the emoji sequence corresponding to the process.

13. A computing system for preparing unstructured data for machine learning analysis, the computing system comprising:

one or more processors; and a memory including computer executable instructions that, when executed by the one or more processors, cause the computing system to:

receive data representing a plurality of processes;

analyze the data to identify, for each process of the plurality of processes, a time-ordered sequence of events that occurred during the process;

generate a plurality of emoji sequences by, for each process of the plurality of processes, generating an emoji sequence, each emoji in the emoji sequence representing an event of the events that occurred during the process, and the emoji sequence ordered in accordance with the time-ordered sequence:

generate graphical representations of the plurality of emoji character sequences, the graphical representations including information about the order in which emojis occur in each emoji sequence;

generate a plurality of feature vectors corresponding to the respective plurality of emoji sequences, the plurality of feature vectors including information based on the graphical representations; and apply a machine learning technique to the plurality of feature vectors.

14. The computing system of claim 13, wherein applying the machine learning technique includes:

training a machine learning model using the plurality of feature vectors.

15. The computing system of claim 14, wherein:

the plurality of processes correspond to a plurality of insurance claims; and training the machine learning model includes training the machine learning model to predict a time duration for processing an insurance claim.

16. The computing system of claim 14, wherein the data is first data, the computer executable instructions further cause the computing system to:

receive second data representing a first process;

analyze the second data to identify a first time-ordered sequence of events that occurred during the first process;

generate a first emoji sequence, each emoji in the first emoji sequence representing an event of the events that occurred during the first process, and the first emoji sequence ordered in accordance with the first time-ordered sequence;

apply the machine learning model to the first emoji sequence.

17. The computing system of claim 13, wherein generating the plurality of feature vectors includes:

for each emoji sequence of the plurality of emoji sequences:

calculating distances between the emoji sequence and other emoji sequences of the plurality of emoji sequences; and including, in the feature vector for the emoji sequence, the distances.

18. The computing system of claim 17, wherein calculating the distances includes:

calculating the distances using a distance metric that measures a number of edits to transform a first sequence into a second sequence.

19. The computing system of claim 17, wherein applying the machine learning technique includes:

generating, by the one or more processors, clusters of similar processors by applying a clustering algorithm configured to use unsupervised machine learning.

20. The computing system of claim 19, wherein emojis in the plurality of emoji sequences are selected from a set of emojis, and wherein the computer executable instructions further cause the computing system to:

generate, for each cluster, a graphical representation of the cluster by:

assigning, to each emoji in the set of emojis, a coordinate of a graph having at least two dimensions; and plotting, for each process of the similar processes, points in the graph based on the emoji sequence corresponding to the process; and rendering, by the one or more processors, for each cluster, the graphical representation on a user interface.

\* \* \* \* \*